Figure 1:
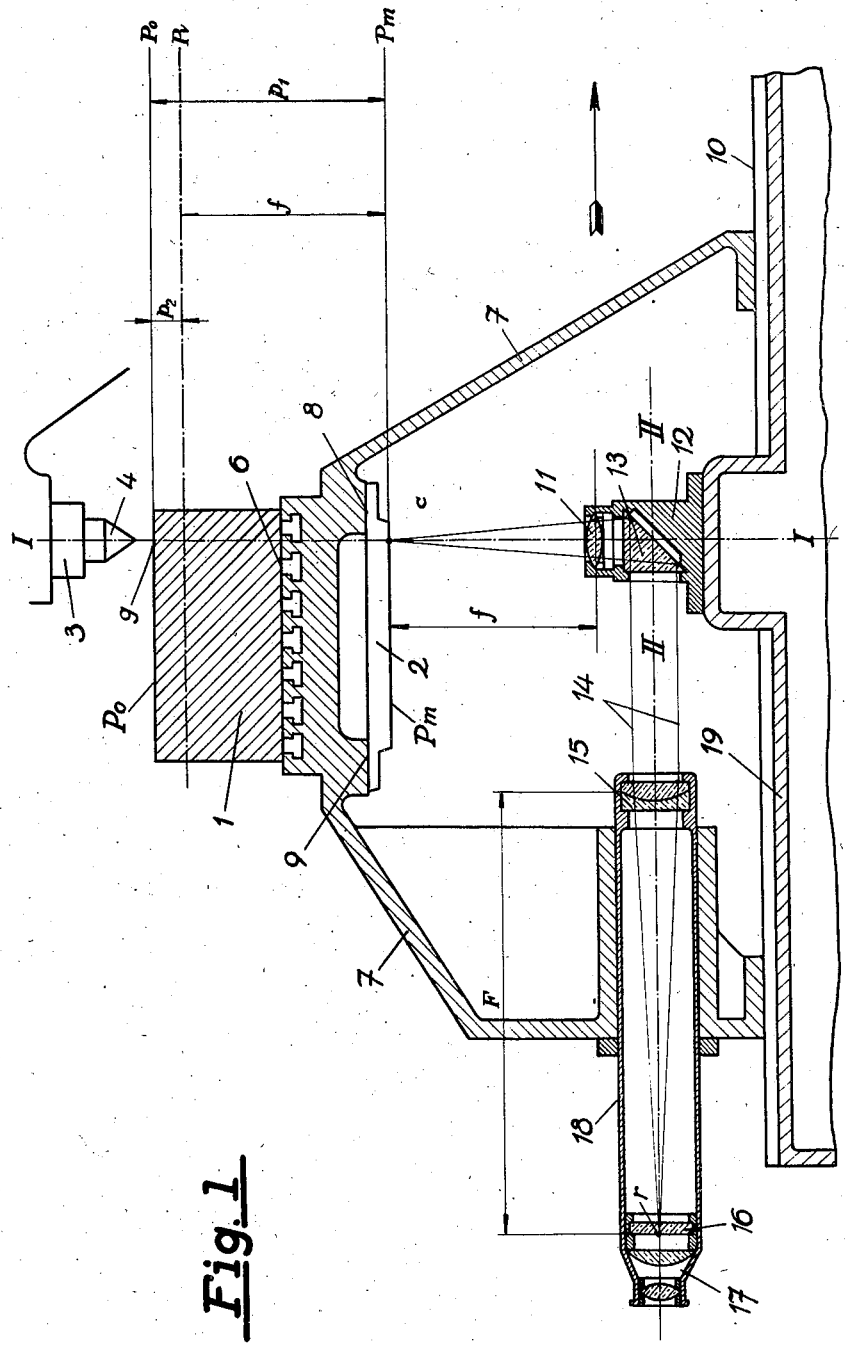

Jan. 30, 1945.    F. TURRETTINI    2,368,434
OPTICAL MEASURING MEANS APPLIED IN MACHINES AND INSTRUMENTS
Filed July 29, 1942    2 Sheets-Sheet 1

Inventor
F. Turrettini
By Mason Kdowning & Seebold
Attys.

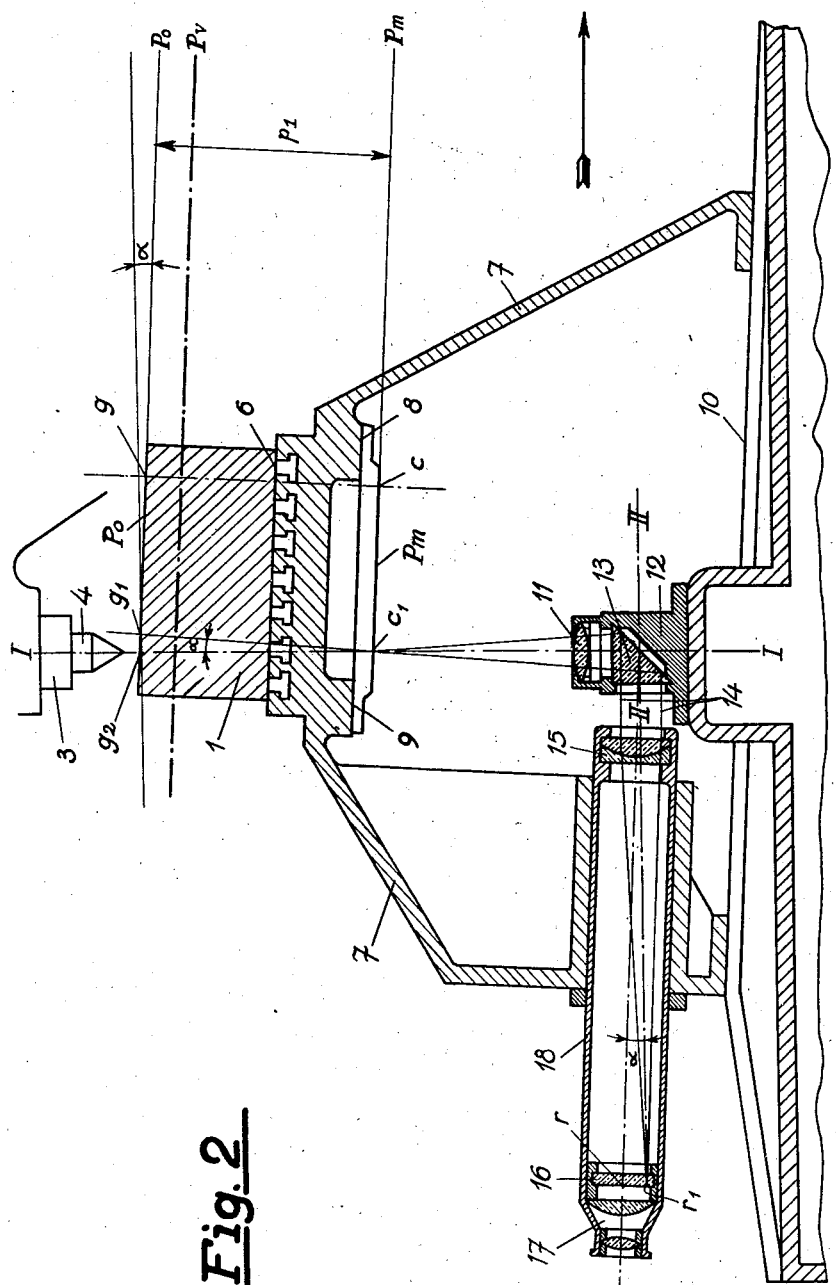

Patented Jan. 30, 1945

2,368,434

UNITED STATES PATENT OFFICE 2,368,434

OPTICAL MEASURING MEANS APPLIED IN MACHINES AND INSTRUMENTS

Fernand Turrettini, Bellevue-Geneva, Switzerland, assignor to Societe Genevoise d'Instruments de Physique, Geneva, Switzerland, a firm of Switzerland Application July 29, 1942, Serial No. 452,792
In Switzerland October 22, 1941

4 Claims. (Cl. 88—1)

Machines-tools equipped with optical measuring means are known, in particular the jig borers. In all these machines, the optical measurement is made by means of a microscope sighting a precision graduated rule which is always placed below the level of the work-table, in order that, on the one hand, it may be protected against damages and that, on the other hand, its presence may not be in the way when disposing the workpieces on the worktable. The latter moves on slides which, theoretically, should be rectilinear, but which, in fact, are never absolutely so (sinuosities reaching 3 to 10 seconds of arc, according to the quality of the execution). It results therefrom that the table, depending on the sinuosities of the slides that guide it, incurs small deviations in its movement of translation. The graduated rule is used for measuring the amplitude of the displacements that must be imparted to the workpiece placed on the work-table in order that the breach of the machine may engage the upper surface of this piece in predetermined points.

If $\alpha$ expresses the angle of the deviation incurred by the table in the course of its translation, the points of engagement of the broach will be affected by an error $p.\tan\alpha$, if $p$ expresses the distance from the point of attack of the broach to the division of the rule, distance measured perpendicularly to the rule. This value $p$ is often called parallax.

One can eliminate the horizontal component of this error by disposing the rule in a vertical plane parallel to the slides and containing the axis of the broach, but it has not been possible, up to the present, to eliminate the vertical component because, on account of the above mentioned constructive necessities, the graduated rule placed under the table finds itself obligatorily much lower than the surface of the workpiece. $p$ represents in this case the level difference existing between the surface of the workpiece and the horizontal plane containing the graduation of the rule.

To put it clearly, this plane will be called, in the following, the "plane of measurement." In other words, a machine thus constructed is only accurate in the plane of measurement because, for a same deviation, the error of measurement is expressed in this plane by the value $L(1-\cos\alpha)$ in which $L$ represents the measured length; the angle $\alpha$ being extremely small, as it has been said above, the term $(1-\cos\alpha)$ becomes practically negligible.

The vertical component of the error due to the deviation will be as much the greater as the workpiece will be larger. The term $p.\tan\alpha$ can be quite appreciable and represents in known constructions several microns.

The advantage of the improvements that make the object of the present invention is to attenuate considerably this drawback by bringing the plane of measurement above the table to the average height of the surface of the workpieces. It creates at this level a virtual plane of measurement, in which the vertical component of the error is absolutely eliminated. In practice, this component will only subsist for the distance remaining between the actual level of the workpiece and the virtual plane of measurement.

These improvements to the optical measuring means, applied in machines and instruments provided with a precision rule used for evaluating the displacements of a slider and an optical system sighting the rule, are characterized by:

A first stationary objective fixed on the bed on which moves the slider and having its main focus in the plane of the rule, A reading telescope fixed on the movable slider, adjusted for infinite and provided with a cross-wire at the main focus of its objective and with an ocular sighting this cross-wire And by at least one optical mirror, The whole to the effect of creating a virtual plane of measurement located in the work-zone above the rule, and distant from the latter by a dimension equal to the focal length of the stationary objective, and thus to reduce considerably the errors due to a deviation of the slide in the vertical plane.

The attached drawings represent, by way of example, an embodiment of the improvements making the object of the invention (applied in a jig borer). The Figures 1 and 2 are two similar views in cross-section, in two different working positions.

In the embodiment represented, 1 is the workpiece laid on a work-table 6 which is part of the slider 7 moving itself on a slide 10 of the bed 19. The surface that the piece presents to the tool is in Po; 2 is the precision graduated rule whose graduation lies in the plane P$m$. This rule is fixed by usual means 8 and 9 on the slider 7 and follows consequently all the travels of this slider. The slider 7 carries a reading-telescope 18 comprising an objective 15 of focal distance F, a cross-wire 16 at the main focus of this objective and an ocular 17; $r$ designates the centre of the crosswire 76 taken arbitrarily as the origin of the measurements in the following explanations.

An objective 11 of focal distance F fixed with a prism 13 in a mount 12, is set permanently on the bed 19. The optical axis I—I of this objective 11 reaches the graduated surface P$m$ of the rule 2 in $c$, point also chosen arbitrarily as origin of the measurements. In this position of the slider 7, the geometrical axis of the working broach 3 carrying a tool 4 engages at $g$ the surface $a$ of the workpiece. The support of the working broach 3 is mounted on the bed 19 by means not shown.

The distance $p_1$ separates the surface P$_0$ of the workpiece from the plane of measurement P$m$.

The rays issued from the point $c$, which for the clearness of the explanation is supposed to be on the vertical of point $g$ (what is not at all indispensable), after having traversed the objective 11 and the prism 13, will be sent back in the form of a parallel beam 14 along the optical axis II—II; they penetrate into the objective 15 and go converging to the centre $r$ of the cross-wire 16, where they form the image of point $c$, whatever may be the distance separating the objective 15 from the prism 13. The image of point $c$ will appear on the cross-wire enlarged in the ratio F/$f$.

In Fig. 2, the slider 7, in moving on the slide 10, is supposed to have incurred an angular deviation $\alpha$ due to an imperfection of the slide, which has been greatly enlarged in Fig. 2 for the clearness of the drawings.

One can always consider a sinuous translation movement as the result of a parallel displacement followed by a rotation movement around a centre chosen arbitrarily. In Fig. 2, the slider is supposed to have effected a parallel motion followed by a rotation of the value $\alpha$ around the point $c_1$, which the optical axis I—I reaches at the end of the parallel motion. The tool will no more engage the workpiece in $g_1$, which would be the co-respective of $c_1$ in relation with $g$, but in $g_2$. The error due to the deviation would thus be $g_1-g_2$, that is $p_1.\tan\alpha$, if the invention were not attenuating it.

The rays emitted by the point $c_1$, which lies on the optical axis I—I of the objective 11, continue to penetrate into the objective 15 in the form of a parallel beam 14 which has incurred no alteration in itself. They do not converge any more in $r$, but in $r_1$, since the reading-telescope 18 has incurred the same deviation $\alpha$ as the slider 7 to which it belongs.

When the slider 7 moves from left to right in the direction of the arrow, the image of a point of the rule 2 moves on the cross-wire 16 in the direction of $r$ towards $r_1$. The distance $r-r_1$, which is equal to F.$\tan\alpha$, corresponds thus, for the observer, to an excess of displacement of the rule 2. In fact, it is equivalent on the graduation of this rule to an excess of displacement of $$\frac{F.\tan\alpha}{G}$$

where $$G=\frac{F}{f}$$

that is of $f.\tan\alpha$, whereas the point of attack of the tool 4 has incurred an excess of displacement of $g_1-g_2=p_1.\tan\alpha$.

One sees that in the virtual plane of measurement P—distance of $f$ from the plane of measurement containing the surface of the rule P$m$—the effect of an error due to a deviation of the slide will be observed in true size, that is to say that the displacement observed on the rule 2 will be equal to the actual distance separating the points of attack of the tool $g$ and $g_2$ on an object having its upper face in the virtual plane of measurement. In other words, there will be no error since the measurment made with the reading-telescope will correspond to the reality of the facts, in spite of the deviation of the slide.

If the surface of the object does not lie in the virtual plane of measurement, but that it is separated from it by a distance $p_2$, the error due to a deviation $\alpha$ of the slide will only be $p_2.\tan\alpha$, which, in any case, will be appreciably smaller than the error $p_1.\tan\alpha$ existing in all the machines before the present invention.

It is not at all necessary that the optical axis I—I coincides with the geometrical axis of the broach 3. If these two axes are separated by a distance D, the error introduced thereby will be represented by the term $D.\tan^2\alpha$, which will be practically negligible, because $\tan^2\alpha$ will be of the order of $10^{-10}$ with slides of ordinary quality. The optical axis of the reading-telescope 18 could obviously be bent by successive reflections on prisms in order to bring the ocular 17 into a position suitable for the observer.

The table could also be provided with a second optical mirror and with a straight reading-telescope facing the latter. Moreover, the ocular of the reading-telescope could be provided with an ocular micrometer in order to ensure more precise readings.

The applications of the invention are not at all limited to machines, but can be extended to any kind of optical measuring apparatuses provided with a precision rule and an optical system for observing its displacements.

What I claim is:

1. In combination, a stationary support, a work holding table slidable on said support, a rule carried by the table, a fixed stationary objective carried by the support arranged with its axis disposed in the plane of said rule and having a focal length approximating the average distance between the surface of the work piece on said table and said rule, a reading telescope movable with the table including an objective and a cross-wire at the focus thereof and an ocular, and means for reflecting the image of said rule formed by the stationary objective for sighting through said reading telescope.

2. In combination, a stationary support, a work holding table slidable on said support, a rule carried by the table, a fixed stationary objective carried by the support arranged with its axis disposed in the plane of said rule and having a focal length approximating the average distance between the surface of the work piece on said table and said rule, a reading telescope movable with the table including an objective and a cross-wire at the focus thereof and an ocular, and means for reflecting the image of said rule formed by the stationary objective for sighting through said reading telescope, the axis of the objective of the telescope being disposed parallel to the direction of sliding movement of the table.

3. In combination, a stationary support, a work holding table slidable on said support, a rule carried by the table, a fixed stationary objective carried by the support arranged with its axis disposed in the plane of said rule and having a focal length approximating the average distance between the surface of the work piece on said table and said rule, a reading telescope movable with the table including an objective and a cross-wire at the focus thereof and an ocular, and means for reflecting the image of said rule formed by the stationary objective for sighting through said reading telescope, the axis of the objective of the telescope being disposed parallel to the direction of sliding movement of the table and the axis of the stationary objective being disposed perpendicularly to the direction of movement of said table.

4. An arrangement as claimed in claim 1, characterized by the provision of an ocular micrometer provided on the ocular of the reading telescope.

FERNAND TURRETTINI.